United States Patent
Hooper et al.

(10) Patent No.: US 9,994,430 B1
(45) Date of Patent: Jun. 12, 2018

(54) SNAP-HOOK WITH DUAL-DIRECTION LOOP SPRING LATCH

(71) Applicant: United States Government, Washington, DC (US)

(72) Inventors: Ralph David Hooper, Lemon Grove, CA (US); Jeffery Towns Gilchrist, Cardiff, CA (US); William A. Chambers, Jamul, CA (US); James Benjamin Penney, Carlsbad, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 0 days. days.

(21) Appl. No.: 15/864,151

(22) Filed: Jan. 8, 2018

Related U.S. Application Data

(60) Provisional application No. 62/471,730, filed on Mar. 15, 2017.

(51) Int. Cl.
| | | |
|---|---|---|
| *B66C 1/38* | (2006.01) | |
| *A44B 13/02* | (2006.01) | |
| *B66C 1/36* | (2006.01) | |
| *F16B 45/02* | (2006.01) | |
| *B63B 21/54* | (2006.01) | |

(52) U.S. Cl.
CPC .............. *B66C 1/36* (2013.01); *F16B 45/025* (2013.01); *B63B 21/54* (2013.01)

(58) Field of Classification Search
CPC ................................. B66C 1/36; F16B 45/025
USPC ............. 294/82.1, 82.13, 82.2, 82.11, 82.14, 294/82.17, 82.23; 24/599.1, 599.2, 599.4, 24/599.6, 599.8, 600.1, 600.2, 600.8; 59/93
See application file for complete search history.

(56) References Cited

U.S. PATENT DOCUMENTS

| | | | | |
|---|---|---|---|---|
| 3,918,758 A | * | 11/1975 | Fournier ................... | B66C 1/36 24/599.7 |
| 5,127,219 A | * | 7/1992 | Herron ..................... | B60D 1/28 24/599.4 |
| 5,913,479 A | * | 6/1999 | Westwood, III .......... | B66C 1/36 24/298 |
| 5,937,490 A | * | 8/1999 | Mihailovic ............. | F16B 45/02 24/599.4 |
| 6,450,558 B1 | | 9/2002 | Ringrose | |
| D484,393 S | * | 12/2003 | Chang ........................... | D8/367 |

(Continued)

*Primary Examiner* — Paul T Chin
(74) *Attorney, Agent, or Firm* — SPAWAR Systems Center Pacific; Kyle Eppele; James Eric Anderson

(57) ABSTRACT

A snap-hook comprising: a hook-shaped body having a throat opening and a shank end, wherein the hook-shaped body includes a primary aperture located at the shank end suitable for attaching a primary line and a secondary aperture located approximately opposite the throat opening suitable for attaching a secondary line; and a dual-direction latch pivotally attached to the hook-shaped body such that the dual-direction latch spans the throat opening when in a neutral position and is capable of pivoting into and out of the throat of the hook-shaped body, wherein the dual-direction latch comprises a bent wire having two free ends, each end inserted in a different hole of two holes in the hook-shaped body that are non-axially-aligned resulting in a spring force that biases the dual-direction latch toward the neutral position and resists pivotal movement of the dual-direction latch both into and out of the throat.

20 Claims, 6 Drawing Sheets

(56) References Cited

U.S. PATENT DOCUMENTS

| | | | |
|---|---|---|---|
| 6,772,488 B1* | 8/2004 | Jensen | F16B 45/02 24/598.6 |
| 7,077,445 B2* | 7/2006 | Yu | F16B 45/02 24/599.4 |
| 2009/0079213 A1* | 3/2009 | Robins | F16B 45/02 294/82.22 |
| 2011/0138586 A1* | 6/2011 | Gompert | F16B 45/02 24/599.4 |
| 2013/0219673 A1* | 8/2013 | Perner | F16B 45/02 24/375 |

* cited by examiner

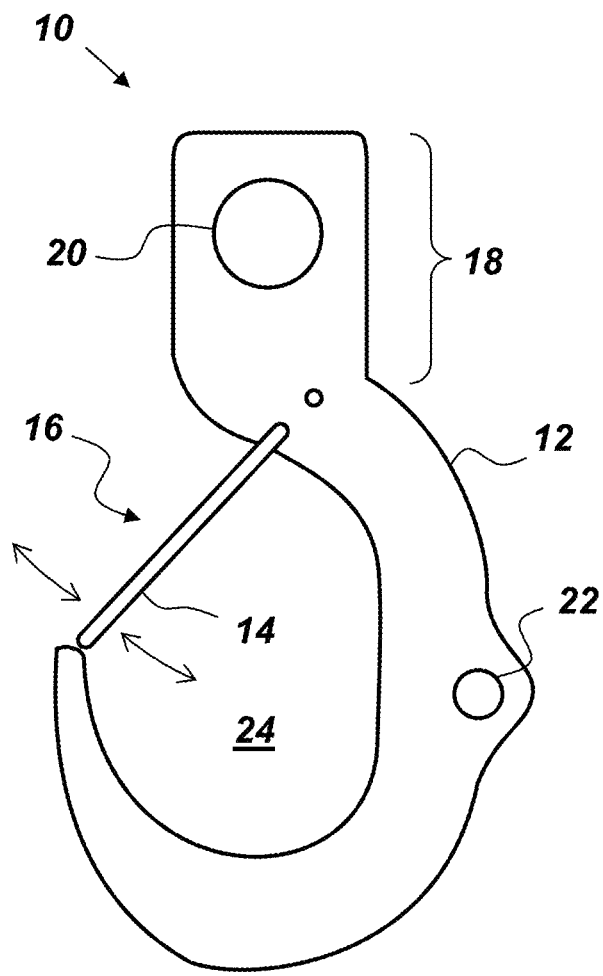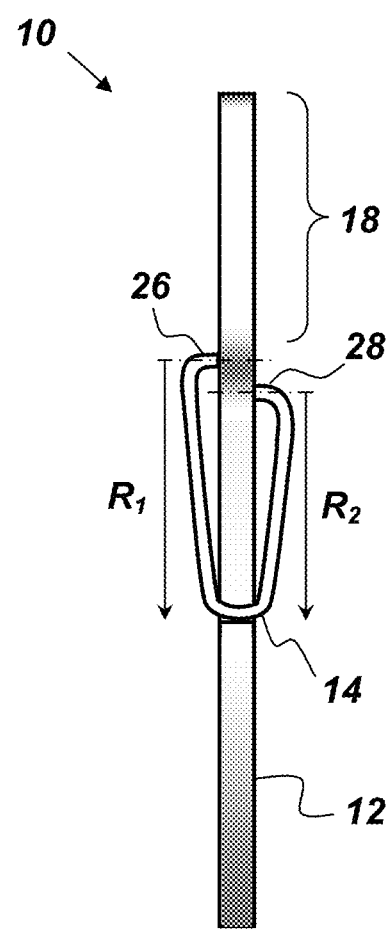
Fig. 2
Fig. 3

SNAP-HOOK WITH DUAL-DIRECTION LOOP SPRING LATCH

CROSS-REFERENCE TO RELATED APPLICATION

This application claims benefit of the provisional U.S. patent application 62/471,730, filed 15 Mar. 2017, titled "Unmanned Underwater Vehicle Transport and Recovery Devices".

FEDERALLY-SPONSORED RESEARCH AND DEVELOPMENT

The United States Government has ownership rights in this invention. Licensing and technical inquiries may be directed to the Office of Research and Technical Applications, Space and Naval Warfare Systems Center, Pacific, Code 72120, San Diego, Calif., 92152; voice (619) 553-5118; ssc_pac_t2@navy.mil. Reference Navy Case Number 104027.

BACKGROUND OF THE INVENTION

The invention claimed herein applies to a device that can attach to and release an object. There are many scenarios where attaching and subsequently releasing a hook to/from an object can be challenging. For example, the current means of launching or recovering an unmanned underwater vehicle (UUV) over the side of a vessels deck into the water often requires a user to lean over the side of the vessel while hanging onto the vessel and either hooking or releasing manually the UUV. This is dangerous for the user and the UUV and can be further complicated by rough seas as both the vessel and UUV are moving.

SUMMARY

Disclosed herein is a snap-hook comprising, consisting of, or consisting essentially of a hook-shaped body and a dual-direction latch. The hook-shaped body has a throat opening, a shank end, a primary aperture, and a secondary aperture. The primary aperture is located at the shank end and is suitable for attaching a primary line. The secondary aperture is located approximately opposite the throat opening and is suitable for attaching a secondary line. The dual-direction latch is pivotally attached to the hook-shaped body such that the dual-direction latch spans the throat opening when in a neutral position and is capable of pivoting into and out of the throat of the hook-shaped body. The dual-direction latch comprises a bent wire having two free ends. Each free end is inserted in a different hole of two holes in the hook-shaped body that are non-axially-aligned resulting in a spring force that biases the dual-direction latch toward the neutral position and resists pivotal movement of the dual-direction latch both into and out of the throat of the hook-shaped body. The dual-direction latch forms a loop spring such that when the latch is bent in either direction the difference in radii (i.e., $R_1$ and $R_2$) of the latch causes a spring affect to oppose motion.

The snap-hook described herein may also be described as comprising a hook-shaped body having a hook tip connected to a neck, which is connected to a shoulder, which is connected to an end shank, wherein the hook tip, neck, and shoulder form a hook with a throat opening. The snap-hook also comprises a dual-direction latch pivotally connected to the hook-shaped body such that the dual-direction latch, when in a neutral position, spans the throat opening but does not contact the hook tip. The dual-direction latch is formed by a bent wire having two free ends which are disposed in non-axially-aligned holes in the hook-shaped body resulting in a spring force that resists pivotal motion of the latch in either direction away from the neutral position.

BRIEF DESCRIPTION OF THE DRAWINGS

Throughout the several views, like elements are referenced using like references. The elements in the figures are not drawn to scale and some dimensions are exaggerated for clarity.

FIG. 2 is a side view of an embodiment of a snap-hook.
FIG. 3 is a front view of an embodiment of a snap-hook.

DETAILED DESCRIPTION OF EMBODIMENTS

The disclosed apparatus below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Figure 1:
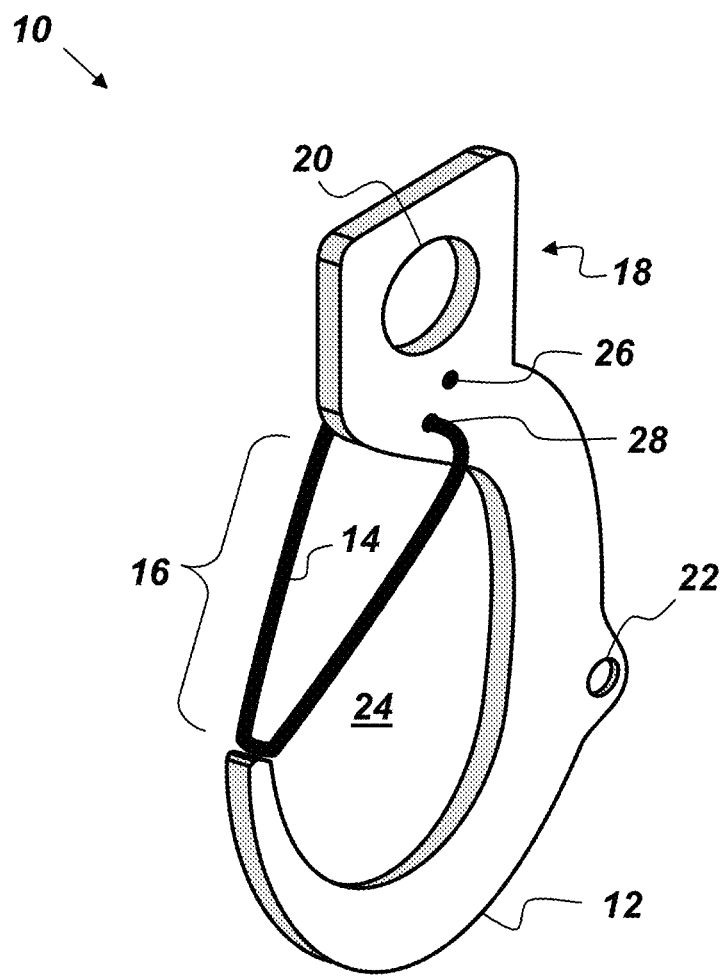
FIG. 1 is an isometric view of an embodiment of a snap-hook.

FIGS. 1, 2, and 3 are respectively isometric, side, and front-view illustrations of an embodiment of snap-hook 10 that comprises, consists of, or consists essentially of a hook-shaped body 12 and a dual-direction latch 14. The hook-shaped body 12 has a throat opening 16, a shank end 18, a primary aperture 20, and secondary aperture 22. The primary aperture 20 is located at the shank end 18 and is suitable for attaching a primary line (such as line 34 depicted in FIG. 6). The secondary aperture 20 is located approximately opposite the throat opening 16 and is suitable for attaching a secondary line (such as line 34 depicted in FIG. 6). The dual-direction latch 14 is pivotally attached to the hook-shaped body 12 such that the dual-direction latch 14 spans the throat opening 16 when in a neutral position (as is shown in FIG. 1) and is capable of pivoting into and out of the throat 24 of the hook-shaped body 12. The dual-direction latch 14 comprises a bent wire having two free ends 26 and 28. Each free end is inserted in a different hole of two holes in the hook-shaped body 12 that are non-axially-aligned resulting in a spring force that biases the dual-direction latch 14 toward the neutral position and resists pivotal movement of the dual-direction latch 14 both into and out of the throat 24 of the hook-shaped body 12. The dual-direction latch 14 forms a loop spring such that when the latch 14 is bent in either direction the difference in radii (i.e., $R_1$ and $R_2$) of the latch 14 causes a spring affect to oppose motion.

Figure 4:
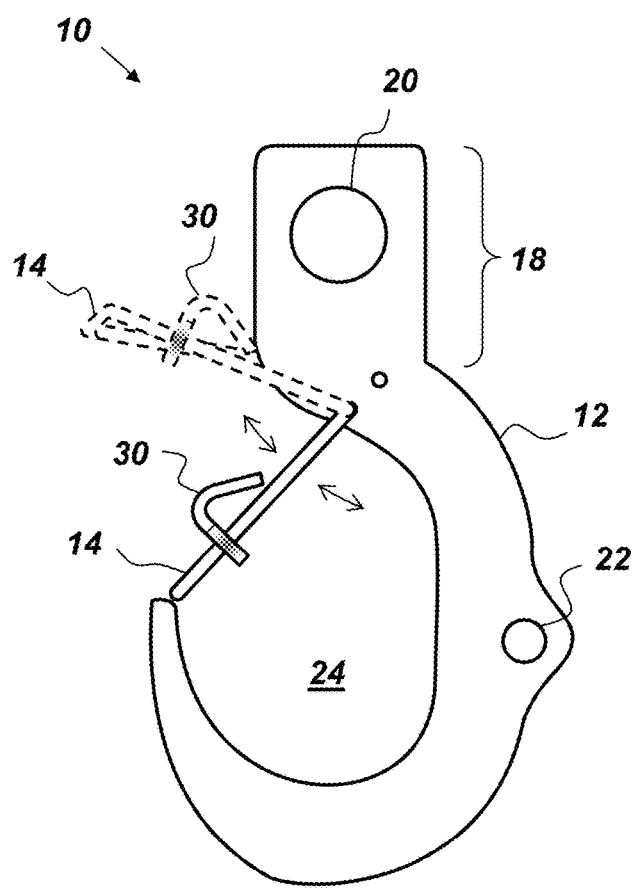
FIG. 4 is a side view of an embodiment of a snap-hook.
Figure 5:
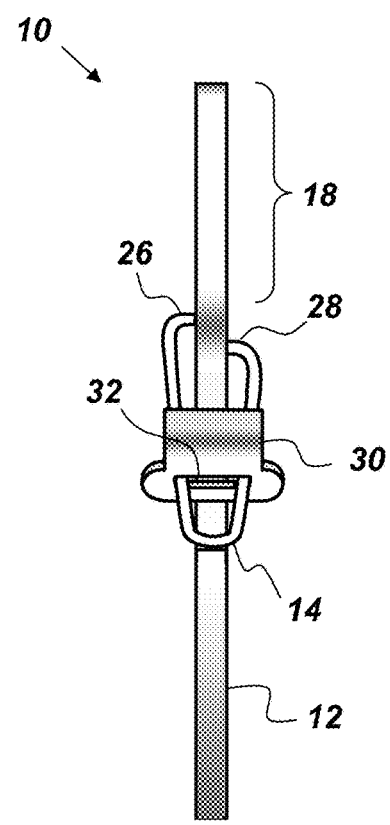
FIG. 5 is a front view of an embodiment of a snap-hook.

FIGS. 4 and 5 are respectively side and front views of an embodiment of the snap-hook 10 that includes a latch guard 30 attached to the dual-direction latch 14. The latch guard 30 is positioned on the latch 14 such that the latch guard 30 serves as a pivot end stop such that the dual-direction latch may pivot away from the throat 24 until the latch guard 30 comes in contact with the shank end 18. The dashed-lined, alternate position of the dual-direction latch 14 shown in FIG. 4 is shown to illustrate the latch guard coming in contact with the shank end 18. The latch guard 30 prevents over-opening of the dual-direction latch 14. The latch guard 30 also is positioned on the latch 14 so as to limit movement of the free ends 26 and 28 away from each other which lessens a likelihood of the free ends coming out of the non-axially-aligned holes in the hook-shaped body 12. The latch guard 30 may be attached to the dual-direction latch 14 by any suitable means known to those having ordinary skill in the art, including, but not limited to, welding, adhesives, fasteners, friction, and clamps. In the embodiment of the snap-hook 10 shown in FIGS. 4 and 5, the latch guard 30 is made of folded sheet metal with a slot 32 cut therein such that the bent wire fits within the slot 32.

Figure 6:
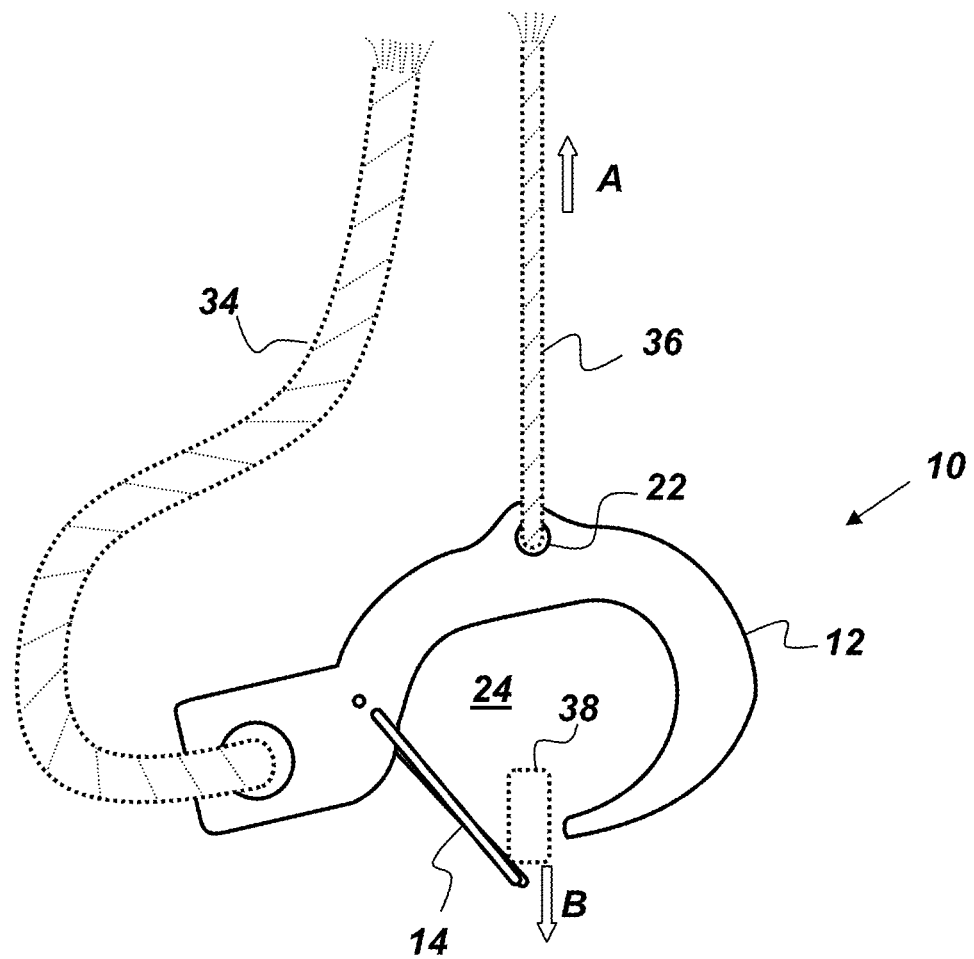
FIG. 6 is a side view of an embodiment of a snap-hook.

FIG. 6 is a side-view illustration of an embodiment of the snap-hook 10 shown connected to a primary line 34 and a secondary line 36. In this embodiment, the secondary aperture 22 is positioned on the hook-shaped body 12 such that when the primary and secondary lines 34 and 46 are attached to the snap-hook 10 and when there is slack in the primary line 34, a pulling force A applied to the secondary line 36 will cause an object 38 disposed within the throat 24 to contact the dual-direction latch 14. The object 38, for example, may be a mooring ring or a lifting bail of an unmanned underwater vehicle (UUV). If the pulling force A is greater than the spring force of the dual-direction latch 14 then the object 38 will push the latch 14 open allowing the object 38 to escape the throat 24 of the snap-hook 10 (provided the weight of the object 38, or other opposing force acting on the object 38, (represented by arrow B) is also greater than the spring force of the dual-direction latch 14).

Figure 7:
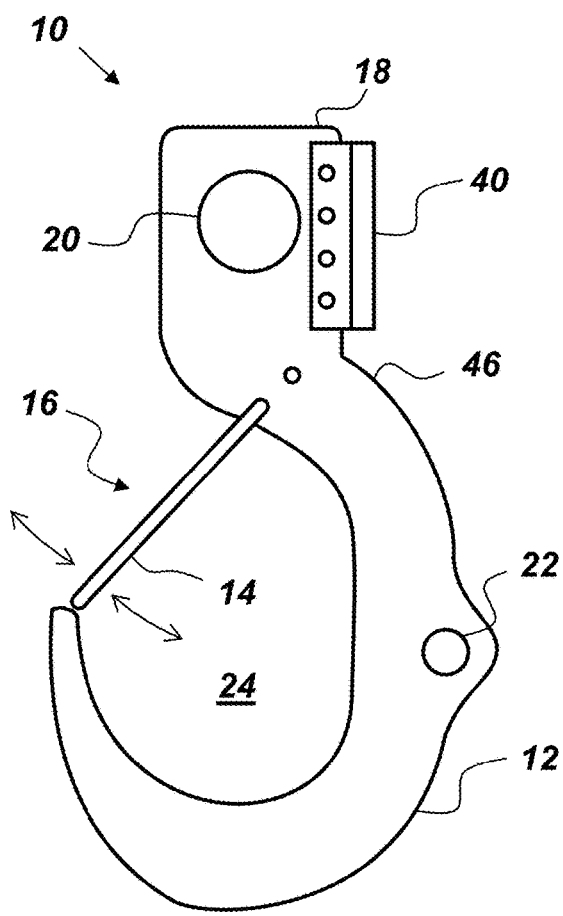
FIG. 7 is a side view of an embodiment of a snap-hook.
Figure 8:
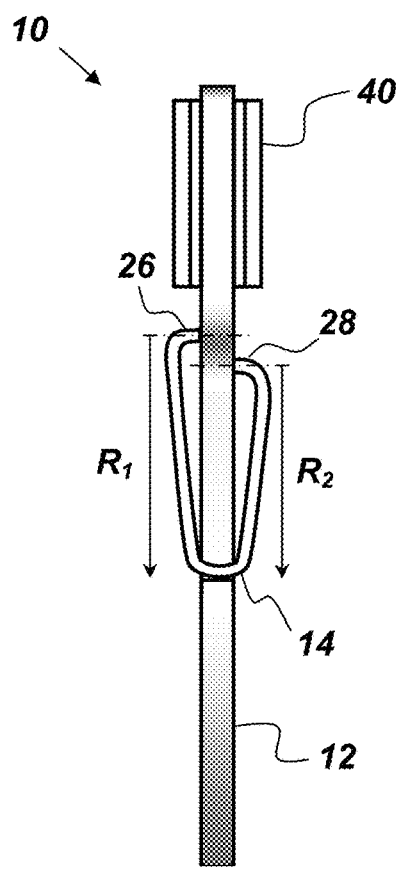
FIG. 8 is a front view of an embodiment of a snap-hook.
Figure 9:
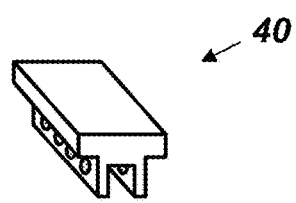
FIG. 9 is a perspective view of an embodiment of a rod adapter track.
Figure 10:
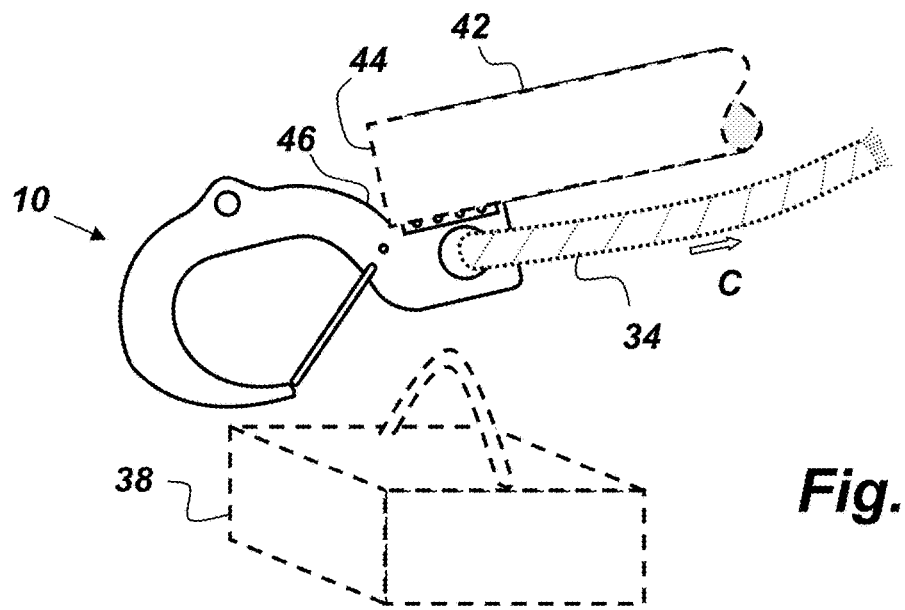
FIG. 10 is a side view of an embodiment of a snap-hook.
Figure 11:
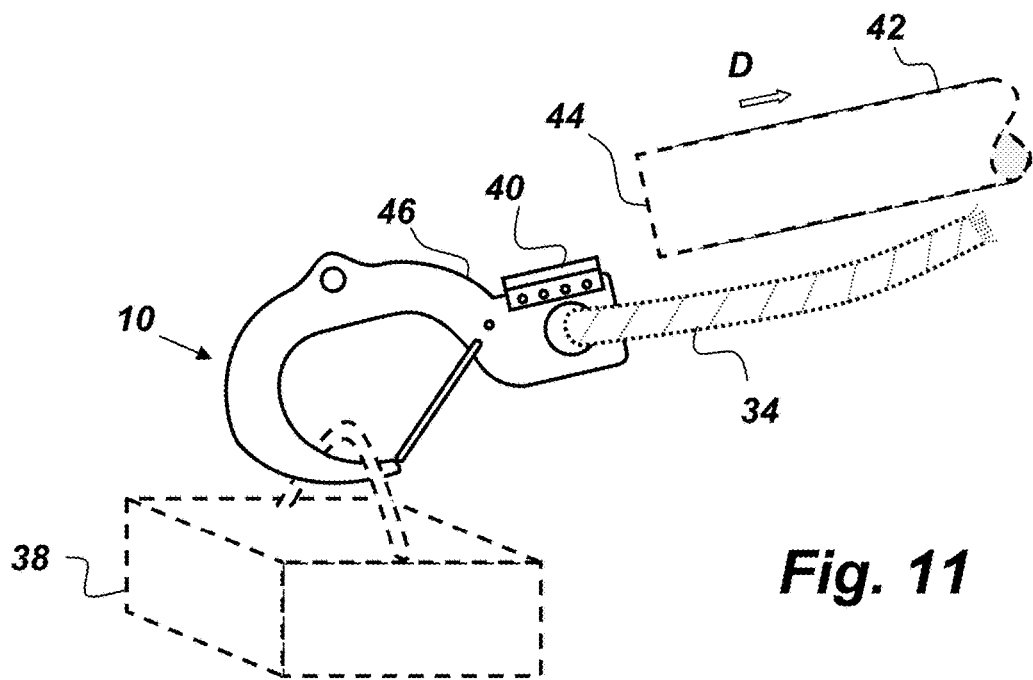
FIG. 11 is a side view of an embodiment of a snap-hook.

FIGS. 7 and 8 are side and front views respectively of an embodiment of the snap-hook 10 comprising a rod adapter track 40 attached to the shank end 18 of the hook-shaped body 12 that allows the snap-hook 10 to releasably mate with a hand-held rod 42 (as shown in FIGS. 10 & 11). FIG. 9 is a perspective view of an embodiment of the rod adapter track 40. The rod adapter track 40 is shaped to enable it to slip or slide on and off of a rod end 44 (also shown in FIGS. 10 & 11). This embodiment of the snap-hook 10 (i.e., the embodiment shown in FIGS. 7-11) may further comprise a shoulder 46 adjoined to the shank end 18 such that the rod 42, when fully mated to the rod adapter track 40 (such as is shown in FIG. 10), contacts, and is prevented from further movement toward the throat 24 by, the shoulder 46.

FIG. 10 is an illustration of the embodiment of the snap-hook 10 shown in FIGS. 7-8 being mated to the rod 42. The rod 42 may be any rod of any length that is capable of being held and wielded by a person. The rode 42 may have any desired cross-sectional shape. For example, a suitable example of the rod 42 includes, but is not limited to, a ~2 meter, T-slotted aluminum pole. As shown, the rod end 44 is in contact with the shoulder 46. The rod 42 may be prevented from sliding off the rod adapter track 40 by applying a pulling force C on the primary line 34. For example, a user holding the rod 42 and the primary line 34 may apply enough force on the primary line 34 to limit relative motion between the rod adapter track 40 and the rod 42. While not shown in FIG. 10, it is to be understood that the secondary line 36 may be used in addition to, or in lieu of, the primary line 34 for limiting the relative motion between the rod adapter track 40 and the rod 42. The rod 42 can be slid onto the rod adapter track 40 until the rod end 44 comes in contact with the shoulder 46. With the snap-hook 10 thus attached to the end of the rod 42, a user can hold the other end of the rod 42 and move the snap-hook 10 into a desired position where it can capture the object 38.

FIG. 11 is another illustration of the embodiment of the snap-hook 10 shown in FIGS. 7-8 and 10 showing the snap-hook 10 being detached from the rod 42. Once the object 38 has been captured by the snap-hook 10, the user may apply a pulling force D to the rod 42 to allow the rod adapter track 40 to slide out of the rod 42. The snap-hook 10 will remain connected to the object 38 and the primary line 34 may be used to lift the object 38 or to act as a mooring line.

For example, if the object 38 is an object that someone would like to recover from the water (such as a UUV after it has completed its mission), the snap-hook 10 may be affixed the end of the rod 42 to allow a person to reach out to the UUV, connect the snap-hook 10 to the lifting bail, remove the rod 42, and then lift the UUV out of the water all from a safe distance (e.g., as far away as one can effectively wield the rod 42). This is a safer procedure—for both personnel and the UUV—than positioning a boat within arms-reach of the UUV and having a person lean over the side of the boat and try to secure a hook to the UUV. An embodiment of the snap-hook 10 that weighs less than 300 grams was designed specifically for launching and recovering UUVs weighing up to 454 kilograms (1000 lbs). The snap-hook 10 may also be used to place the UUV into the water in a safe manner.

Continuing with the example scenario where the object 38 is a UUV, the snap-hook 10 may also be used to aid in launching the UUV. First, the UUV may be lowered into the water via the primary line 34, which is attached to the snap-hook 10, which in turn is connected to the UUV's lifting bail. Once the UUV is in the water and the primary line 34 is made slack, the secondary line 36 may be pulled with sufficient force to cause the snap-hook 10 to reposition itself on the lifting bail such that the lifting bail pushes the dual-direction latch 14 open and releases the UUV. Mention has been made of using the snap-hook 10 in connection with launching and recovering UUVs, but it is to be understood that use of the snap-hook 10 is not so limited to UUVs, but may be used in other applications where one desires a hook with a dual-direction latch.

From the above description of the snap-hook 10, it is manifest that various techniques may be used for implementing the concepts of the snap-hook 10 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that the snap-hook 10 is not limited to the particular embodiments described herein, but is capable of many embodiments without departing from the scope of the claims.

We claim:
1. A snap-hook comprising:
 a hook-shaped body having a throat opening and a shank end, wherein the hook-shaped body includes a primary aperture located at the shank end suitable for attaching a primary line and a secondary aperture located approximately opposite the throat opening suitable for attaching a secondary line; and a dual-direction latch pivotally attached to the hook-shaped body such that the dual-direction latch spans the throat opening when in a neutral position and is capable of pivoting into and out of the throat of the hook-shaped body, wherein the dual-direction latch comprises a bent wire having two free ends, wherein each end is inserted in a different hole of two holes in the hook-shaped body that are non-axially-aligned resulting in a spring force that biases the dual-direction latch toward the neutral position and resists pivotal movement of the dual-direction latch both into and out of the throat of the hook-shaped body.

2. The snap-hook of claim 1, further comprising a latch guard attached to and positioned on the dual-direction latch such that the latch guard serves as a pivot end stop such that the dual-direction latch may pivot away from the throat until the latch guard comes in contact with the shank thereby preventing over-opening of the dual-direction latch.

3. The snap-hook of claim 2, wherein the latch guard is positioned on the latch so as to limit movement of the free ends away from each other which lessens a likelihood of the free ends coming out of the non-axially-aligned holes.

4. The snap-hook of claim 3, wherein the latch guard is made of folded sheet metal with a slot cut therein such that the bent wire fits within the slot.

5. The snap-hook of claim 4, wherein the hook-shaped body weighs less than 300 grams.

6. The snap-hook of claim 1, wherein the secondary aperture is located such that when the primary and secondary lines are attached and there is slack in the primary line, a pulling force applied to the secondary line will cause an object disposed within the throat of the hook-shaped body to contact the dual-direction latch.

7. The snap-hook of claim 6, further comprising a rod adapter track attached to the shank of the hook-shaped body, wherein the rod adapter track is shaped to enable the rod adapter track to slidingly mate with an end of a hand-held rod by slipping on and off the rod end.

8. The snap-hook of claim 6, wherein the hook-shaped body is designed to hold up to 454 kilograms (1000 lbs).

9. The snap-hook of claim 1, wherein the hook-shaped body further comprises a shoulder adjoined to the shank such that the rod, when fully mated to the rod adapter track, contacts, and is prevented from further movement toward the throat by, the shoulder.

10. The snap-hook of claim 9, wherein the throat is suitable for capturing a lifting bail of an unmanned underwater vehicle (UUV).

11. A snap-hook comprising:
a hook-shaped body having a hook tip connected to a neck, which is connected to a shoulder, which is connected to an end shank, wherein the hook tip, neck, and shoulder form a hook with a throat opening; and
a dual-direction latch pivotally connected to the hook-shaped body such that the dual-direction latch, when in a neutral position, spans the throat opening but does not contact the hook tip, wherein the dual-direction latch is formed by a bent wire having two free ends which are disposed in non-axially-aligned holes in the hook-shaped body resulting in a spring force that resists pivotal motion of the dual-direction latch in either direction away from the neutral position.

12. The snap-hook of claim 11, further comprising a primary attachment point in the shank end suitable for attaching a primary line to the snap-hook.

13. The snap-hook of claim 12, further comprising a secondary attachment point in the neck suitable for attaching a secondary line to the snap-hook.

14. The snap-hook of claim 13, further comprising a latch guard positioned on the dual-direction latch so as to prevent movement of the free ends away from each other.

15. The snap-hook of claim 14, wherein the latch guard has a raised section that serves as an end stop that comes in contact with the shank end when the dual-direction latch is fully opened away from the throat.

16. The snap-hook of claim 15, wherein the latch guard is made of sheet metal having a slot therein in which the bent wire is disposed and the raised section is formed by a bend in the sheet metal.

17. The snap-hook of claim 13, further comprising a rod adapter track attached to the shank end such that the rod adapter track, with the hook-shaped body attached thereto, may be slid onto, or off of, an end of a rod.

18. The snap-hook of claim 17, wherein the shoulder and shank are disposed with respect to each other such that the rod, when fully slid onto the rod adapter track, comes into contact with the shoulder.

19. The snap-hook of claim 13, wherein the secondary attachment point is positioned on the neck such that when the snap-hook has an object in its throat and there is slack in the primary line, a pulling force on the secondary line causes the hook-shaped body to move such that the object comes in contact with the dual-direction latch.

20. The snap-hook of claim 1, wherein the dual-direction latch is configured to be forced open by the object if the pulling force on the secondary line is sufficient to overcome the spring force thereby releasing the object from the snap-hook.

\* \* \* \* \*